United States Patent
Langrick

(10) Patent No.: US 10,858,481 B2
(45) Date of Patent: Dec. 8, 2020

(54) PROCESS FOR SUPPRESSING FOAM FORMATION IN THE MANUFACTURE OF HYDROPHILIC POLYAMIDES

(71) Applicant: INVISTA NORTH AMERICA S.A.R.L., Wilmington, DE (US)

(72) Inventor: Charles Richard Langrick, Middlesbrough (GB)

(73) Assignee: INVISTA North America S.a.r.l., Wilmington, DE (US)

( * ) Notice: Subject to any disclaimer, the term of this patent is extended or adjusted under 35 U.S.C. 154(b) by 189 days.

(21) Appl. No.: 16/066,435

(22) PCT Filed: Dec. 30, 2016

(86) PCT No.: PCT/US2016/069439
§ 371 (c)(1),
(2) Date: Jun. 27, 2018

(87) PCT Pub. No.: WO2017/120112
PCT Pub. Date: Jul. 13, 2017

(65) Prior Publication Data
US 2019/0016857 A1 Jan. 17, 2019

Related U.S. Application Data

(60) Provisional application No. 62/276,333, filed on Jan. 8, 2016.

(51) Int. Cl.
*C08G 69/26* (2006.01)
*C08G 69/28* (2006.01)
*B01J 19/00* (2006.01)
*B01J 19/18* (2006.01)
*C08G 69/40* (2006.01)

(52) U.S. Cl.
CPC .......... *C08G 69/40* (2013.01); *B01J 19/0013* (2013.01); *B01J 19/18* (2013.01); *C08G 69/265* (2013.01); *C08G 69/28* (2013.01); *B01J 2219/0025* (2013.01); *B01J 2219/00029* (2013.01); *B01J 2219/00051* (2013.01); *B01J 2219/00162* (2013.01)

(58) Field of Classification Search
USPC ........................................................ 528/340
See application file for complete search history.

(56) References Cited

U.S. PATENT DOCUMENTS

| | | | |
|---|---|---|---|
| 4,919,997 | A | 4/1990 | Twilley et al. |
| 5,164,261 | A | 11/1992 | Windley |
| 5,179,175 | A | 1/1993 | Speranza et al. |
| 5,810,890 | A | 9/1998 | Russ et al. |
| 6,855,425 | B2 | 2/2005 | Lancaster |
| 6,869,453 | B1 | 3/2005 | Lewis et al. |
| 2008/0090945 | A1 | 4/2008 | Langrick et al. |
| 2012/0065362 | A1 | 3/2012 | Amey |

FOREIGN PATENT DOCUMENTS

| | | |
|---|---|---|
| WO | 2014/057363 A1 | 4/2014 |
| WO | 2014/179049 A1 | 11/2014 |
| WO | 2015/001515 A1 | 1/2015 |
| WO | 2015/047742 A1 | 4/2015 |
| WO | 2016/030764 A2 | 3/2016 |
| WO | 2017/120112 A1 | 7/2017 |

OTHER PUBLICATIONS

Hunter et al., "Special Scales for White Colors", The Measurement of Appearance, Second Edition, Ch. 10, John Wiley & Sons, Inc., 1987, 16 pages.
Jahnke, Tamera, "Nylon Plastics Handbook Edited by Melvin I. Kohan", Journal of the American Chemical Society, vol. 118, No. 34, 1995, 631 pages.
Lofquist et al., "Hydrophilic Nylon for Improved Apparel Comfort", Textile Research Journal, vol. 55, issue. 6, Jun. 1, 1985, pp. 325-333.
International Preliminary Report on Patentability received for PCT Application No. PCT/US2016/069439, dated Jul. 19, 2018, 11 pages.
International Search Report and Written Opinion received for PCT Application No. PCT/US2016/069439, dated May 11, 2017, 13 pages.
International Application No. PCT/US15/47742, filed on Aug. 31, 2015, 35 pages.

*Primary Examiner* — Fred M Teskin
(74) *Attorney, Agent, or Firm* — Invista North America S.A.R.L.

(57) ABSTRACT

Disclosed is a process for making a polyetheramine containing polyamide without excessive foaming in successive batches by providing a controlled heat input rate step for those batch runs that incorporate polyetheramine containing polyamide heel from previous runs.

20 Claims, No Drawings

PROCESS FOR SUPPRESSING FOAM FORMATION IN THE MANUFACTURE OF HYDROPHILIC POLYAMIDES

FIELD

Disclosed is a process for making polyetheramine containing polyamides without excessive foaming on consecutive batches.

BACKGROUND

Polyetheramines are known for improving the tactile properties of synthetic polymer fibers and fabrics.

U.S. Pat. No. 5,179,175 to Speranza and Champion discloses a method for introducing polyetheramines into a nylon-6,6 polymer which comprises prereacting a polyether diamine having a molecular weight of 190 to 1000 with adipic acid and reacting the adipic acid amide with the salt of nylon-6,6 and hexamethylene diamine to form a homogeneous copolymer.

Nylon 6 polyamide can be modified to improve its tactile properties as textile fiber. See R. A. Lofquist, et al., "Hydrophilic Nylon for Improved Apparel Comfort," Textile Research Journal, June 1985, p. 325-333. These authors copolymerized caprolactam with polyethyleneoxy diamines and dibasic acids such as terephthalic acid. U.S. Pat. No. 4,919,997 discloses water-absorbing mats made using these techniques.

While the role of polyetheramines for improving tactile properties in nylons is well known, incorporating the polyetheramines into nylons at the desired concentrations at commercial scale has presented its own set of challenges.

In the conventional polyamide synthesis process, the means of incorporating a desired functionality into the polyamide copolymer has been to add the monomer at the first cycle, known as the salt stage, together with all other additives at the beginning of the polymerization process. The polymerization process then continues in multiple cycles where the pressure and temperature conditions are carefully adjusted to effectively remove the water (as steam), the poly-condensation byproduct. The initial cycles in the process contain the highest water content and consequently have a high rate of steam release. As the process continues, the water content is reduced to the residual level in the polymer melt.

Any level of foaming is a nuisance to deal with in any chemical synthesis process. Steady foam develops with rigid gas-liquid cell interfaces and rapidly grows in process equipment and lines, especially in high-water containing environments and/or under vacuum conditions. In the polyamide synthesis, the rising polymer melt viscosity further complicates the water bubble formation, migration to the melt surface and steam disengagement from the melt surface which also contributes to excessive foaming. In processes involving severe foaming, the process vacuum lines were observed to be blocked as a result of polymer entrainment from rising foam in the lines. Undesired blockages in the process vacuum lines by solidified polymer lead to process and controls instabilities which result in inferior polymer quality, not to mention process disruptions with significant cost penalties.

WO2014/057363 teaches a method for introducing hydrophilic functionality into the polyamide copolymer, by reactive incorporation of hydrophilic additive such as up to 15 wt. % of a hydrophilic polyetherdiamine. Examples of such additives include Elastamine® RE 2000 monomer and Jeffamine® ED-2003, both of which are commercially available from Huntsman Corporation of The Woodlands, Tex. Scale-up tests have revealed that the initial polymerization cycles may trigger severe foaming from the increased steam release under certain process conditions.

PCT Application US2015/047742, filed Aug. 31, 2015, discloses a process for making polyamide comprising: (a) heating an aqueous solution of diacid and diamine to convert at least a portion of the diacid and diamine to polyamide; (b) removing water from the aqueous solution of (a) to at least partially concentrate the aqueous solution; (c) adding polyetheramine to the at least partially concentrated aqueous solution of (b); and (d) heating the solution of (c) to further polymerize the diacid, diamine and polyetheramine and to remove water from the solution. This process addresses the problem of how to avoid excessive foaming when producing a polymer containing a profoaming polyetheramine for a first batch on a batch asset. However, it has been found that when making subsequent consecutive batches where a residual portion of the polyetheramine containing polyamide is present in these consecutive batches that foaming can again manifest itself when replicating the process disclosed in PCT Application US2015/047742.

Thus it would be desirable to provide a commercially acceptable process wherein excessive foam/froth could be managed on consecutive batches while still including a polyetheramine additive.

SUMMARY

Disclosed is a process for making polyamide comprising: (a) at least partially polymerizing a first aqueous charge of a diamine and a diacid to form polyamide in a reactor; (b) adding a polyetheramine to the reactor and further polymerizing the diamine, diacid and polyetheramine to form polyetheramine-containing polyamide in the reactor; (c) recovering a first portion of the polyetheramine-containing polyamide from the reactor and retaining a second portion of the polyetheramine-containing polyamide within the reactor; (d) loading the reactor with a second aqueous charge of diamine and diacid and at least partially polymerizing the second aqueous charge with the second portion of the polyetheramine-containing polyamide within the reactor; (e) heating the reactor at heat input rate Q1 to temperature range T1 and pressure range P1; (f) reducing the heat input rate to Q2 and holding the reactor at temperature range T2 and pressure range P2 for reaction time sufficient to reduce the water content of the polymerizing mass without causing unacceptable foaming ; (g) adding polyetheramine to the reactor; and (h) increasing the heat input rate to the reactor to Q3, where Q3>Q2, and at least partially venting the reactor to control pressure at or below range P1 to form polyetheramine-containing polyamide within the reactor.

The disclosed process can comprise agitating the second aqueous charge within the reactor during step (f).

The second aqueous charge loaded to the reactor can contain from 10 wt. % to 30 wt. % water; for example, from 15 wt. % to 25 wt. % water; for example, from 15 wt. % to 20 wt. % water.

The polyetheramine can be present in the finished polymer product in an amount ranging from 1 wt. % to 20 wt. % of the polyamide; for example, from 2 to 15 wt. %; for example, from 3 to 8 wt. %.

If the polyamide is produced from a diacid, the diacid can be selected from the group consisting of oxalic acid, malonic acid, succinic acid, glutaric acid, pimelic acid, adipic acid, suberic acid, azelaic acid, sebacic acid, undecanedioic acid, dodecandioic acid, maleic acid, glutaconic acid, traumatic acid, and muconic acid, 1,2- or 1,3-cyclohexane dicarboxylic acids, 1,2- or 1,3-phenylenediacetic acids, 1,2- or 1,3-cyclohexane diacetic acids, isophthalic acid, terephthalic acid, 4,4'-oxybisbenzoic acid, 4,4-benzophenone dicarboxylic acid, 2,6-napthalene dicarboxylic acid, p-t-butyl isophthalic acid and 2,5-furandicarboxylic acid, and mixtures thereof and wherein the diamine is selected from the group consisting of ethanol diamine, trimethylene diamine, putrescine, cadaverine, hexamethyelene diamine, 2-methyl pentamethylene diamine, heptamethylene diamine, 2-methyl hexamethylene diamine, 3-methyl hexamethylene diamine, 2,2-dimethyl pentamethylene diamine, octamethylene diamine, 2,5-dimethyl hexamethylene diamine, nonamethylene diamine, 2,2,4- and 2,4,4-trimethyl hexamethylene diamines, decamethylene diamine, 5-methylnonane diamine, isophorone diamine, undecamethylene diamine, dodecamethylene diamine, 2,2,7,7-tetramethyl octamethylene diamine, bis(p-aminocyclohexyl)methane, bis(aminomethyl)norbornane, $C_2$-$C_{16}$ aliphatic diamine optionally substituted with one or more $C_1$ to $C_4$ alkyl groups, aliphatic polyether diamines and furanic diamines, such as 2,5-bis(aminomethyl)furan, and mixtures thereof.

It should be understood that the concept of producing a polyamide from diamines and diacids also encompasses the concept of other suitable monomers, such as, aminoacids or lactams. Without limiting the scope, examples of aminoacids can include: 6-aminohexanoic acid; 7-aminoheptanoic acid; 11-aminoundecanoic acid; 12-aminododecanoic acid. Without limiting the scope of the disclosure, examples of lactams can include: caprolactam, enantholactam; lauryllactam. Suitable feeds for the disclosed process can include mixtures of diamines, diacids, aminoacids and lactams, and can include monofunctional monomers as well as multifunctional monomers.

The reaction mix can further comprise a catalyst and other additives, such as, delusterants, antioxidants, UV stabilizers well known in the art and incorporated by means well known in the art.

The polyetheramine can be a polyetherdiamine, for example a polyetherdiamine having a number average molecular weight of at least 1500.

The temperature range T2 for holding step (f) can be from 160° C. to 250° C.; for example, 190° C. to 230° C.

The polyamide can have a moisture regain from 10 to 30%, preferably from 10 to 25%, and more preferably from 15 to 25%.

The second portion of polyamide can contain polyetheramine.

Step (b) can be carried out in the absence of any one of steam cleaning, water washing or acid-solution washing.

The second portion of polyamide retained in the reactor can be a liquid or solidified film on at least a portion of the reactor internals.

Suitable relationships for Q1 and Q2 include the following:

$$0.05 < \frac{Q2}{Q1} < 0.95;$$

$$0.10 < \frac{Q2}{Q1} < 0.85;$$

$$0.10 < \frac{Q2}{Q1} < 0.75; \text{ and}$$

$$0.15 < \frac{Q2}{Q1} < 0.70.$$

With a reasonable amount of trial and error, the disclosed ranges for T1 and P1 are generally compatible to achieve the results desired for the disclosed process. Suitable values for T1 include from 160° C. to 250° C. Suitable values for P1 include from 200 psia to 325 psia.

T1 can range from 190° C. to 230° C. and P1 can range from 250 psia to 310 psia.

Suitable times for step (f) include about 1 to about 40 minutes; about 5 to about 25 minutes; and about 7 to about 20 minutes.

Further disclosed is a process for making polyamide comprising: (a) charging diamine and diacid to the feed inlet of a continuous plug flow reactor under reaction conditions to at least partially form polyamide; (b) adding a first stream of polyetheramine to the continuous plug flow reactor and further polymerizing the diamine, diacid and polyetheramine to form polyetheramine-containing polyamide in the continuous plug flow reactor; (c) recovering a first portion of the polyetheramine-containing polyamide from the outlet of the continuous plug flow reactor and recycling a second portion of the polyetheramine-containing polyamide to a recycle charge point downstream of the feed inlet; (d) providing a primary polymerization section of the continuous plug flow reactor at heat input rate Q1 to temperature range T1 and pressure range P1; (e) providing a secondary polymerization section downstream of the primary polymerization section of the continuous plug flow reactor, at heat input rate to Q2<Q1 and holding the reactor at temperature range T2 and pressure range P2 for reaction time sufficient to reduce the water content of the polymerizing mass without causing unacceptable foaming ; (f) adding a second stream of polyetheramine to the continuous plug-flow reactor downstream of the secondary polymerization section; and (g) providing a tertiary polymerization zone with heat input rate Q3, where Q3>Q2, and at least partially venting the continuous plug flow reactor to control pressure at or below range P1 to form polyetheramine-containing polyamide within the continuous plug flow reactor.

The process may employ polyamide precursors other than diacids and diamines as described below. Further disclosed is process for making polyamide comprising: (a) at least partially polymerizing a first aqueous charge of polyamide precursor to form polyamide in a reactor; (b)adding a polyetheramine to the reactor and further polymerizing the polyamide precursor and polyetheramine to form polyetheramine-containing polyamide in the reactor; (c) recovering a first portion of the polyetheramine-containing polyamide from the reactor and retaining a second portion of the polyetheramine-containing polyamide within the reactor; (e) loading the reactor with a second charge of polyamide precursor and at least partially polymerizing the second aqueous charge with the second portion of polyetheramine-containing polyamide within the reactor; (f) heating the reactor at heat input rate Q1 to temperature range T1 and pressure range P1; (g) reducing the heat input rate to Q2 and holding the reactor at temperature range T2 and pressure range P2 for reaction time sufficient to reduce the water content of the polymerizing mass without causing unacceptable foaming; (h) adding polyetheramine to the reactor; and (i) increasing the heat input rate to the reactor to Q3, where Q3>Q2, and at least partially venting the reactor to control pressure at or below range P1 to form polyetheramine-containing polyamide within the reactor.

The polyetheramine may be present in an amount ranging from 1 wt. % to 20 wt. % of the polyamide, preferably from 5 to 15 wt. %, more preferably from 10 to 15 wt. %. The aqueous solution may further comprises a catalyst and other additives, such as, delusterants, antioxidants, UV stabilizers well known in the art and incorporated by means well known in the art. In one embodiment the polyamide precursors comprise diamines, diacids, aminoacids and lactams and mixtures of. The polyetheramine may be a polyetherdiamine. In one embodiment the polyetheramine may have a weight average molecular weight of at least 1500. In another embodiment the polyetheramine may have a number average molecular weight of at least 1500. The solution in step (a) may be heated to a temperature from 190 to 230° C. The solution in step (d) may be heated to a temperature from 240 to 320° C. The polyamide may have a moisture regain from 10 to 30%; for example from 10 to 25%; for example from 15 to 25%.

DETAILED DESCRIPTION

Introduction

Disclosed is a process for making polyamide, especially in batch processes when making consecutive batches, the process comprising heating an aqueous solution of diacid and diamine in the presence of a residue of polyamide comprising a polyetheramine from a previous process, to convert at least a portion of the diacid and diamine to polyamide; removing water from the aqueous solution to at least partially concentrate the aqueous solution sufficiently to reduce the propensity of the aqueous solution to form a stable foam layer that is, to reduce the water content of the polymerizing mass without causing unacceptable foaming; adding polyetheramine to the at least partially concentrated aqueous solution; and heating the solution to further polymerize the diacid, diamine and polyetheramine and to remove water from the polymerizing mass. The disclosed process addresses the problem of severe foaming by reducing the heat input during the critical stage of the process and so control the rate of steam release. Thereafter selectively delaying the polyetheramine additive, e.g., polyetherdiamine, introduction into the polymerization process, until there is reduced water content and thus the rate of steam evolution is comparatively low and hence the propensity to foam is substantially reduced. The improvement comes in not having to deal with the buildup of foam in process equipment and vacuum lines where the entrained polymer solidifies with partial or complete line blockage.

In the disclosed process, a hydrophilic polyetheramine, e.g., a polyetherdiamine, is added to improve moisture regain properties. Additionally, a portion of hydrophilic polyetheramine (incorporated into the nylon polymer from the previous batch) is also present in the reaction zone as carried-over heel. From a reaction engineering standpoint, it would be desirable to introduce all of the hydrophilic polyetherdiamine at the beginning of the polymerization cycle to maximize the opportunity for incorporation into the finished polymer. However, the disclosed process takes a counterintuitive approach by intentionally foregoing a portion of the available reaction time by introducing hydrophilic polyetherdiamine later in the process. While the presence of the carried-over heel has been found to require a different reaction conditions, these different steps allow addition of hydrophilic functionality later in the process, e.g., after the aqueous solution is at least partially concentrated, and produce the finished hydrophilic polyamide with equally acceptable water regain properties. In a conventional process, the additives are typically introduced at the beginning of the process to maximize the probability of incorporation into the polymer matrix.

The disclosed process improves the process of polyamide synthesis, especially in the presence of hydrophilic additives, by minimizing the foaming problem. Thus the problem of unacceptably excessive foaming when conducting consecutive processes during the multi-cycle synthesis of polyamides, when reactively incorporated with functional hydrophilic linkages, is solved by reducing the heat input during critical stages of the process and selectively delaying the hydrophilic additive introduction into the polymerization process, for example, in the later stages of the process as against in the beginning of the polymerization process.

Definitions

Although the following detailed description contains many specifics for the purpose of illustration, a person of ordinary skill in the art will appreciate that many variations and alterations to the following details are within the scope of the herein disclosed embodiments. Accordingly, the following embodiments are set forth without any loss of generality to, and without imposing limitations upon any claimed invention. Before the present disclosure is described in greater detail, it is to be understood that this disclosure is not limited to particular embodiments described, as this may vary. It is also to be understood that the terminology used herein is for the purpose of describing particular embodiments only, and is not intended to be limiting, since the scope of the present disclosure will be limited only by the appended claims. Unless defined otherwise, all technical and scientific terms used herein have the same meaning as commonly understood by one of ordinary skill in the art to which this disclosure belongs.

The term "Amine Hydrogen Equivalent Weight" (AHEW) is defined as the molecular weight of the polyetheramine divided by the number of active amine hydrogens per molecule. For illustration, an idealized polyetherdiamine having a number average molecular weight of 2000 and where all the ends of the polyether were amine ends, hence contributing 4.0 active amine hydrogens per molecule, would have an AHEW of 500 g per equivalent. If, for comparison, 10 percent of the ends were in fact hydroxyl rather than amine, then there would be only 3.6 active amine hydrogens per molecule and the polyetheramine would have an AHEW of 556 g per equivalent. The number of active amine hydrogen per molecule, and therefore the AHEW, of a given polyetheramine may be calculated according to known and conventional techniques in the art, however it is preferably calculated by determining the amine group nitrogen content using the procedure described in ISO 9702.

The term "aliphatic group" refers to a saturated or unsaturated linear or branched hydrocarbon group and encompasses alkyl, alkenyl, and alkynyl groups, for example.

The terms "alk" or "alkyl" refer to straight or branched chain hydrocarbon groups having 1 to 12 carbon atoms, for example 1 to 8 carbon atoms, such as methyl, ethyl, n-propyl, i-propyl, n-butyl, i-butyl, t-butyl, pentyl, hexyl, heptyl, n-octyl, dodecyl, octadecyl, amyl, 2-ethylhexyl, and the like. An alkyl group is optionally substituted, unless stated otherwise, with one or more groups, selected from aryl (optionally substituted), heterocyclo (optionally substituted), carbocyclo (optionally substituted), halo, hydroxy, protected hydroxy, alkoxy (e.g., C1 to C7) (optionally substituted), acyl (e.g., C1 to C7), aryloxy (e.g., C1 to C7) (optionally substituted), alkylester (optionally substituted), arylester (optionally substituted), alkanoyl (optionally substituted), aroyl (optionally substituted), carboxy, protected carboxy, cyano, nitro, amino, substituted amino, (monosubstituted) amino, (disubstituted)amino, protected amino, amido, lactam, urea, urethane, sulfonyl, and the like.

The term "alkenyl" refers to straight or branched chain hydrocarbon groups having 2 to 12 carbon atoms, for example 2 to 4 carbon atoms, and at least one double carbon to carbon bond (either cis or trans), such as ethenyl. An alkenyl group is optionally substituted, unless stated otherwise, with one or more groups, selected from aryl (including substituted aryl), heterocyclo (including substituted heterocyclo), carbocyclo (including substituted carbocyclo), halo, hydroxy, alkoxy (optionally substituted), aryloxy (optionally substituted), alkylester (optionally substituted), arylester (optionally substituted), alkanoyl (optionally substituted), aroyl (optionally substituted), cyano, nitro, amino, substituted amino, amido, lactam, urea, urethane, sulfonyl, and the like.

The term "alkynyl" refers to straight or branched chain hydrocarbon groups having 2 to 12 carbon atoms, for example 2 to 4 carbon atoms, and at least one triple carbon to carbon bond, such as ethynyl. An alkynyl group is optionally substituted, unless stated otherwise, with one or more groups, selected from aryl (including substituted aryl), heterocyclo (including substituted heterocyclo), carbocyclo (including substituted carbocyclo), halo, hydroxy, alkoxy (optionally substituted), aryloxy (optionally substituted), alkylester (optionally substituted), arylester (optionally substituted), alkanoyl (optionally substituted), aroyl (optionally substituted), cyano, nitro, amino, substituted amino, amido, lactam, urea, urethane, sulfonyl, and the like.

Phrases such as "suitable to provide," "sufficient to cause," or "sufficient to yield," or the like, in the context of methods of synthesis, refers to reaction conditions related to time, temperature, solvent, reactant concentrations, and the like, that are within ordinary skill for an experimenter to vary to provide a useful quantity or yield of a reaction product. It is not necessary that the desired reaction product be the only reaction product or that the starting materials be entirely consumed, provided the desired reaction product may be isolated or otherwise further used.

It should be noted that ratios, concentrations, amounts, and other numerical data may be expressed herein in a range format. It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range includes "'x' to 'y.'" To illustrate, a concentration range of "0.1% to 5%" should be interpreted to include not only the explicitly recited concentration of 0.1 wt. % to 5 wt. %, but also include individual concentrations (e.g., 1%, 2%, 3%, and 4%) and the sub-ranges (e.g., 0.5%, 1.1%, 2.2%, 3.3%, and 4.4%) within the indicated range. In an embodiment, the term " " may include traditional rounding according to significant figures of the numerical value. In addition, the phrase "'x' to 'y'" includes "'x' to 'y.'"

The term "about" as used herein, when referring to a numerical value or range, allows for a degree of variability in the value or range, for example, within 10%, or, in one aspect within 5%, of a stated value or of a stated limit of a range.

In addition, where features or aspects of the disclosure are described in terms of a list or a Markush group, those skilled in the art will recognize that the disclosure is also thereby described in terms of any individual member or subgroup of members of the Markush group. For example, if X is described as selected from the group consisting of bromine, chlorine, and iodine, claims for X being bromine and claims for X being bromine and chlorine are fully described as if listed individually. For example, where features or aspects of the disclosure are described in terms of such lists, those skilled in the art will recognize that the disclosure is also thereby described in terms of any combination of individual members or subgroups of members of list or Markush group. Thus, if X is described as selected from the group consisting of bromine, chlorine, and iodine, and Y is described as selected from the group consisting of methyl, ethyl, and propyl, claims for X being bromine and Y being methyl are fully described and supported.

As used herein, all percent compositions are given as weight-percentages, unless otherwise stated. When solutions of components are referred to, percentages refer to weight-percentages of the composition including solvent (e.g., water) unless otherwise indicated.

As used herein, all molecular weights of polymers are (Mw) weight-average molecular weights, or (Mn) number-average molecular weights, unless otherwise specified.

All publications and patents cited in this specification are herein incorporated by reference as if each individual publication or patent were specifically and individually indicated to be incorporated by reference and are incorporated herein by reference to disclose and describe the methods and/or materials in connection with which the publications are cited. The citation of any publication is for its disclosure prior to the filing date and should not be construed as an admission that the present disclosure is not entitled to antedate such publication by virtue of prior disclosure. Further, the dates of publication provided could be different from the actual publication dates that may need to be independently confirmed.

As will be apparent to those of skill in the art upon reading this disclosure, each of the individual embodiments described and illustrated herein has discrete components and features that may be readily separated from or combined with the features of any of the other several embodiments without departing from the scope or spirit of the present disclosure. Any recited method may be carried out in the order of events recited or in any other order that is logically possible.

Embodiments of the present disclosure employ, unless otherwise indicated, techniques of chemistry, and the like, which are within the skill of the art. Such techniques are explained fully in the literature.

Polyamide Polymerization

The polyamide polymerization process, e.g., for producing nylon, typically consists of a number of stages. In the Evaporative Stage (on a commercial batch plant typically done in a separate vessel, the Evaporator as well known in the art), the salt concentration of the salt solution is increased from about 50% to about 85%, e.g., from 50 to 80 wt. %, by evaporation of much of the water of solution under modest pressure. The concentrated salt solution is then transferred into the polymerization vessel, the autoclave, as well known in the art. In Cycle 1 Stage, the autoclave vessel is sealed and the temperature of the salt solution increased while the concentration is kept constant. In Cycle 2 Stage, the pressure is controlled while steam is vented off and the temperature increased. This increases the concentration of the mass further while keeping the temperature hot enough to keep the salt and oligomers/polymer being formed as a result of polymerization in solution. In Cycle 3 Stage, a controlled pressure reduction of the steam atmosphere back to atmospheric pressure is performed while again keeping the mixture molten as the temperature increases. In Cycle 4 Stage, the vessel is kept at atmospheric pressure or below (vacuum) allowing for the last stages of water removal and promoting polymerization to useful molecular weight. The temperature increases to its maximum. In Cycle 5 Stage, the vessel is sealed, a slight pressure of nitrogen introduced and the polymer then extruded from the autoclave via a suitable casting outlet, the extruded polymer lace is then typically cooled in water and the cooled lace then chopped into polymer pellets by a cutter. These Stages and the reasons for them are all well known in the art. See for example Nylon Plastics handbook; Ed. Melvin I Kohan; Hanser/Gardner Publications; ISBN: 1-56990-189-9; Sections 2.3 and 13.2.3.2.

The polymer synthesis may first comprise heating an aqueous solution of diacid and diamine to convert at least a portion of the diacid and diamine to polyamide. The diacid may be a dicarboxylic acid and may be selected from the group consisting of oxalic acid, malonic acid, succinic acid, glutaric acid, pimelic acid, adipic acid, suberic acid, azelaic acid, sebacic acid, undecanedioic acid, dodecandioic acid, maleic acid, glutaconic acid, traumatic acid, and muconic acid, 1,2- or 1,3-cyclohexane dicarboxylic acids, 1,2- or 1,3-phenylenediacetic acids, 1,2- or 1,3-cyclohexane diacetic acids, isophthalic acid, terephthalic acid, 4,4'-oxybisbenzoic acid, 4,4-benzophenone dicarboxylic acid, 2,6-napthalene dicarboxylic acid, p-t-butyl isophthalic acid and 2,5-furandicarboxylic acid, and mixtures thereof. The diamine may be selected from the group consisting of ethanol diamine, trimethylene diamine, putrescine, cadaverine, hexamethyelene diamine, 2-methyl pentamethylene diamine, heptamethylene diamine, 2-methyl hexamethylene diamine, 3-methyl hexamethylene diamine, 2,2-dimethyl pentamethylene diamine, octamethylene diamine, 2,5-dimethyl hexamethylene diamine, nonamethylene diamine, 2,2, 4- and 2,4,4-trimethyl hexamethylene diamines, decamethylene diamine, 5-methylnonane diamine, isophorone diamine, undecamethylene diamine, dodecamethylene diamine, 2,2,7,7-tetramethyl octamethylene diamine, bis(p-aminocyclohexyl)methane, bis(aminomethyl)norbornane, C2-C16 aliphatic diamine optionally substituted with one or more C1 to C4 alkyl groups, aliphatic polyether diamines and furanic diamines, such as 2,5-bis(aminomethyl)furan, and mixtures thereof. In preferred embodiments, the diacid is adipic acid and the diamine is hexamethylene diamine which are polymerized to form nylon 6,6.

As described above, the polymer synthesis is operated in multiple stages or cycles, where the temperature and pressure conditions are carefully adjusted for progressive removal of the byproduct water from the polymer melt. The conditions are maintained to reduce the water content in a stepwise manner while keeping foaming from building up. In most cases antifoaming agents are introduced in the process to maintain the level of foaming. The foaming problem becomes severe when the hydrophilic functionality is introduced into the polymer. Other than the use of antifoaming agents and/or standard gas-liquid disengagement equipment designs to facilitate better steam evolution from the melt, there are no simple methods to avoid foaming. At commercial scale, the problem of foaming is to be dealt with by adjusting process parameters and routine maintenance cycles, adding cost to the process.

In particular, one aspect of the disclosed process is a polyamide wherein the polyamide comprises a nylon and a polyetherdiamine, the polyetherdiamine having a molecular weight of at least 1500 and an AHEW of less than 10 percent higher than the idealized AHEW for the polyetherdiamine, and preferably wherein the polyamide has a moisture regain ranging from about 10 to about 30%, e.g., from about 10 to about 25% or from about 15 to about 25%.

In another aspect the disclosed process relates to a process for producing a polyamide which comprises contacting a diacid, a polyetherdiamine, and a nylon salt; forming a mixture; heating the mixture in a closed vessel to a temperature and autogenous pressure sufficient to cause polymerization of the mixture; and forming a polyamide; preferably where the polyamide is characterized by a moisture regain of about 10% to about 30%, e.g., from about 10 to about 25% or from about 15 to about 25%.

In another aspect the disclosed process relates to a yarn comprising a polyamide, said polyamide comprising a nylon and a polyetherdiamine, the polyetherdiamine having a molecular weight of at least 1500 and an Amine Hydrogen Equivalent Weight (AHEW) of less than 10 percent higher than the idealized AHEW for the polyetherdiamine, and preferably wherein the polyamide has a moisture regain value ranging from about 10% to about 30%, e.g., from about 10 to about 25% or from about 15 to about 25%. Also disclosed are fabrics made from the disclosed yarn as well as textile products such as apparel made from the disclosed yarn.

The polyamides of the disclosed process are well-suited for making hydrophilic polyamide compositions. As such, the disclosure herein generally also relates to improved synthetic polyamide polymer compositions, e.g., nylon. Generally, the polyamides of the disclosed process comprise a nylon and a polyetheramine. As used herein, the term "composition" refers to a composition which is not a yarn or fibre or is not a textile or fabric or garment containing such a yarn or fibre. Such a composition is, however, suitable for making a yarn or fibre and a textile or fabric or garment containing such yarns or fibres.

Generally, such polyamides comprise a nylon and a polyetheramine, e.g., polyetherdiamine, and may have a moisture regain (measured as described herein) ranging from about 10 to about 30%, preferably from about 10 to about 25%, preferably from about 15 to about 25%. Such regain may allow for improved processability during subsequent processing of the present polyamide compositions. For example, the polyamide may have an elongation to break of from 20% to 90% when spun into a yarn. The polyamide composition may be either an acid (anionic) or base (cationic) dyeable polymer, as discussed herein. In one embodiment, at least 85% of the polymer backbone (between amide units) may comprise aliphatic groups. The nylon discussed herein may be polyhexamethylene adipamide (nylon 6,6), polycaproamide (nylon 6), or copolymers of either of these. In one embodiment, the nylon may be nylon 6,6. Generally, the nylon may be present in the polyamide in an amount ranging from about 50% to 95% by weight.

The polyetherdiamine may be made by reacting polyethyleneglycol of molecular weight of about 2000 with typically three to ten molecules of propyleneoxide to ensure a high statistical conversion of the primary terminal hydroxyl groups to secondary hydroxyl ends. The secondary hydroxyl ends are subsequently converted into amine groups by methods well known in the art. Incomplete conversion of the hydroxyl to amine groups results in a polyetherdiamine product containing residual hydroxyl end groups, such hydroxyl groups are incapable of forming amide groups during a polyamide polymerization process, limiting the rate and degree of polymerization, and are hence undesirable. Such incomplete conversion is reflected in the AHEW value of the polyetherdiamine being higher than the idealised value. The Technical Data Sheet for Elastamine® RE-2000 describes the polyetherdiamine as being a polyetherdiamine of approximate number average molecular weight 2000, hence it has an idealised AHEW of 500 g per equivalent, the datasheet further reports the actual AHEW as being 505 g per equivalent. For comparison, the Technical Data Sheet for Jeffamine® ED-2003 describes the polyetherdiamine as being a polyetherdiamine of approximate molecular weight 2000; hence it also has an idealised AHEW of 500 g per equivalent, the datasheet further reports the actual AHEW as being 575 g per equivalent.

The polyamides generally comprise a polyetheramine with an AHEW less than 10% higher than the idealized AHEW for the polyetheramine. The polyetheramine is preferably a polyetherdiamine. In one embodiment, the polyetheramine may be an alkylpolyetheramine. In one aspect, the polyetheramine may include aliphatic groups. In still another aspect, the polyetheramine may be Elastamine® RE-2000 (Huntsman International LLC). In one embodiment, the polyetheramine is a polyetherdiamine and may have the following structure:

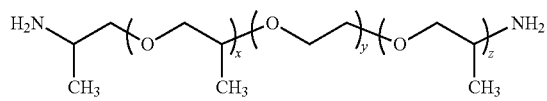

$y \approx 39, (X+Z) \approx 6$

In a further embodiment, the polyetheramine may be α,ω-diamino poly(oxyalkylene-co-oxyalkylene ether) copolymer. In one aspect, the α,ω-diamino poly(oxyalkylene-co-oxyalkylene ether) copolymer may be α,ω-diamino poly(oxyethylene-co-oxytetramethylene ether) copolymer, as disclosed in United States Patent Application No. 20120065362A1. Such a polyetheramine may be made by reacting poly(oxyethylene-co-oxytetramethylene ether)diol of molecular weight of 2000 with typically three to ten molecules of propyleneoxide to ensure high statistical conversion of the primary terminal hydroxyl groups to secondary hydroxyl ends. The secondary hydroxyl ends are subsequently converted into amine groups by methods well known in the art.

As discussed herein, a polyetherdiamine may be employed in the polymerization of nylon monomers to form a polyamide which may be spun into nylon yarns which exhibit good hydrophilicity properties. Such properties may impart tactile aesthetics and wear comfort highly desired in apparel goods manufactured from these yarns.

Furthermore, the polyetheramines may be present in the polyamide and may have various molecular weights depending upon the desired properties of the resulting polymer, including processability as discussed herein. In one embodiment, the polyetheramine may have a Mn or Mw molecular weight of at least 1500. In other aspects, the polyetheramine may have a Mn or Mw molecular weight of at least 2500, or even at least 5000. Additionally, the polyetheramine may be present in an amount ranging from about 1 to about 20 wt. % of the polyamide. In one aspect, the polyetheramine may be present in an amount ranging from about 2 to about 15 wt. %, preferably from about 10 to about 15 wt. %. In another preferred embodiment, the polyetheramine is present in an amount from about 5 to about 8 wt. %.

The polyamides described herein may further comprise a diacid in addition to the diacid used to form the nylon salt. In one example, the diacid may be a diacid as disclosed herein. In further embodiments, the diacid may be an aliphatic diacid containing from 6 to 12 carbon atoms, terephthalic acid, isophthalic acid, and mixtures thereof. In one aspect, the diacid may be adipic acid. The diacid may be present in the polymer in an amount to give substantially equimolar proportions of acid groups to amine groups of the polyetheramine. The polyamides described herein may have various physical properties. In one embodiment, the polyamide may have 42 to 49 amine end group gram-equivalents per 1000 kilograms of polymer. Additionally, the polyamide may have a relative viscosity ranging from about 35 to about 45. In another embodiment, the relative viscosity may be calculated based on a formic acid test method according to ASTM D789-86 known at the time of filing the present disclosure in the United States Patent and Trademark Office. The polyamide may have a yellowness index from about 30 to about 45. In a more detailed aspect, the polyamide may have an L* color coordinate from about 75 to about 85. In another aspect, the polyamide may have an a* color coordinate from about −5 to about 5. In still another aspect, the polyamide may have a b* color coordinate from about 5 to about 25.

Whiteness may be determined using a test method conforming to the CIE whiteness rating for each sample. Samples may be measured individually for whiteness (W) and yellowness (Y), using a GRETAG MACBETH "COLOR EYE" reflectance spectrophotometer. First, by determining the CIELAB color coordinates L, a* and b*; and then, calculating W and Y by means know in the art (see: ASTM Method E313-1996 Standard Practice for Calculating Whiteness and Yellowness Indices from Instrumentally Measured Color Coordinates). Details of this measurement are found in Color Technology in the Textile Industry 2nd Edition, published by Committee RA 36, AATCC (1997); see in this volume: Special Scales for White Colors by Harold and Hunter, pp 140-146, and the references therein, all are incorporated herein by reference in their entirety.

Additionally, the present polyamides may further comprise a catalyst. In one embodiment, the catalyst may be present in the polyamide in an amount ranging from 10 ppm to 1,000 ppm by weight. In another aspect, the catalyst may be present in an amount ranging from 10 ppm to 100 ppm by weight. The catalyst may include, without limitation, phosphoric acid, phosphorous acid, hypophosphoric acid arylphosphonic acids, arylphosphinic acids, salts thereof, and mixtures thereof. In one embodiment, the catalyst may be sodium hypophosphite, manganese hypophosphite sodium phenylphosphinate, sodium phenylphosphonate, potassium phenylphosphinate, potassium phenylphosphonate, hexamethylenediammonium bis-phenylphosphinate, potassium tolylphosphinate, or mixtures thereof. In one aspect, the catalyst may be sodium hypophosphite.

The polyamides and polyamide compositions in accordance with the disclosed process may include an "optical brightener." Such an optical brightener may be provided according to the disclosures of United States Patent Application No. 20080090945 A1; POLYAMIDE COMPOSITION WITH IMPROVED HEAT STABILITY AND WHITENESS; to INVISTA NORTH AMERICA S.à r.l.

The polyamides and polyamide compositions in accordance with embodiments disclosed herein may be improved in whiteness appearance through the addition of an optical brightener. Such polyamides may exhibit a permanent whiteness improvement and may retain this whiteness improvement through operations such as heat setting. In one embodiment, the optical brightener may be present in the polyamide in an amount ranging from 0.01 wt. % to 1 wt. %.

In another embodiment an improvement in whiteness appearance may be achieved by addition of a delustering agent, the delustering agent may be titanium dioxide.

In addition, these polyamide compositions may contain an antioxidant stabilizer or an antimicrobial additive. Additionally, the polyamide compositions may contain an anti-foaming additive. In one embodiment, the anti-foaming additive may be present in the polyamide in an amount ranging from 1 ppm to 500 ppm by weight.

The polyamides of the disclosed process are inherently acid (anionic) dyeable, but may also be rendered into a basic (cationic) dyeing form by modifying these polymers or copolymers with a cationic dye receptive monomer copolymerized in the polymer. This modification makes compositions particularly receptive to coloration with base (cationic) dyes. 5-sodium sulfoisophthalic acid is an example of such a cationic dye receptive monomer.

In a further aspect, the disclosed process provides a process for producing a polyamide, comprising nylon polymer precursors (typically a nylon salt, lactam, or aminoacid and mixtures thereof); optionally forming a mixture of the precursors in water; heating the mixture in a closed vessel to a temperature and autogenous pressure sufficient to cause polymerization of the mixture; and partially forming the polyamide thereby; then further addition comprising at least a polyetherdiamine to form a desired composition.

The processes for producing the polyamides may further comprise providing to the mixture a catalyst, including those discussed herein. The processes may further comprise providing an anti-foaming additive to the mixture. The processes may further comprise providing an optical brightener to the mixture.

Generally, the nylon monomers of the polyamide may be added as a salt, aminoacid, or lactam. The nylon monomer may be a nylon 6,6 salt formed from adipic acid and hexamethylene diamine and may be present in the polyamide in an amount ranging from about 50 wt. % to 95 wt. %.

Various processing parameters may be used in the polymerization of the present polyamides including temperature and pressure. The temperature may range from 190° C. to 290° C. and the autogenous pressure may range from 250 pounds per square inch absolute (psia) to 300 pounds per square inch absolute (psia). Additionally, the heating may be performed under partial vacuum. The partial vacuum attained is subject to autoclave design and economic considerations with the process.

Generally, the present polymerization may involve various serial heating cycles. Such cycles have been described in Nylon Plastic Handbook; Ed Melvin I Kohan; Hanser; 1995; ISBN 1-56990-189-9, FIG. 2.5 of which shows a typical PA-66 batch polymerization process and details of pressure, melt temperature, % water off (and by inference % water remaining). Such cycles may individually comprise a heating temperature profile and a pressure profile. Generally the intent is to keep the system fluid through a combination of temperature for sufficient melt, and water content for sufficient solubility. The serial heating cycles may comprise: a first heating cycle (C1) having a temperature starting between 170 to 215° C. and finishing between 190 to 230° C. over a period of 20 to 40 minutes under a pressure of between 130 to 300 psia; a second heating cycle (C2) having a temperature starting between 190 to 230° C. and finishing at between 240 to 260° C. over a period of 20 to 45 minutes under a pressure of between 130 to 300 psia; a third heating cycle (C3) having a temperature starting between 240 and 260° C. and finishing between 250 to 320° C. over a period of between 15 to 45 minutes under a pressure of between 300 psia to atmospheric pressure; and a fourth heating cycle (C4) having a temperature starting between 250 to 320° C. and finishing between 250 to 320° C. over a period of 15 to 80 minutes under a pressure of between atmospheric pressure and about 200 mBar absolute vacuum. Finally the polymer is extruded using methods well known in the art. Generally, the polyamide composition is inherently acid dyeable and may, as an option, comprise a cationic dyeable polymer. The polyamide composition may contain polyhexamethylene adipamide (nylon 6,6), or polycaproamide (nylon 6), or copolymers of either of these.

The disclosed process adds a polyetheramine during the second or later heating cycle. In an embodiment, the process adds the polyetheramine to at least one of the second, third, fourth, or subsequent heating cycles. The polyetheramine additive may also be charged to the polymerization reaction mixture when the reaction mixture has lost sufficient water to no longer maintain a stable foam at reaction conditions. For example, the polyetheramine additive may be charged to the polymerization reaction mixture when the reaction mixture contains less than 70 wt. % water, for example less than 60 wt. % water, preferably less than 20% water (typical water level at start of C3 described above) and most preferably less than 7% water (typical water level at start of C4 described above). Generally, the process for producing the polyamide composition may be made by an autoclave process. The process may start with a concentrated slurry (the twin slurry also incorporating the concept of a solution) prepared from an aqueous solution of a nylon salt, aminoacid or lactam or mixtures of e.g., a nylon 6,6 salt, that is provided to an autoclave vessel. Optionally, the slurry may be dilute and become more concentrated by means of an evaporation step. The slurry may be prepared from an aqueous solution of the monomers, such as, hexamethylene diamine and adipic acid, in the manner known in the art. In another specific embodiment, the slurry may contain a minor amount of nylon 6 monomer with the aqueous solution of the nylon 6,6 monomers in the form of an aqueous caprolactam solution. The optionally added aqueous caprolactam solution may be mixed with the nylon salt in an amount to provide a nylon 6 content of about 0.5 wt. % to about 10 wt. %. The autoclave vessel may then be heated to 230° C. (or some other functional temperature) allowing the internal (autogenous) pressure to rise. A delusterant, titanium dioxide ($TiO_2$) may optionally be injected into the autoclave and monomer mixture as an aqueous dispersion.

In one embodiment, an aqueous slurry or a melt of a polyetheramine may be injected to the mixture in the autoclave vessel along with a quantity of a diacid, e.g., adipic acid, to give substantially equimolar proportions of acid groups to amine groups of the polyetheramine In another embodiment a melt of a polyetheramine may be injected to the mixture in the autoclave vessel. The mixture may then be heated in the autoclave to about 245° C. (or some other functional temperature). While at this temperature, the autoclave pressure may be reduced to atmospheric pressure and further reduced in pressure by application of a vacuum in the known manner, to form the polyamide composition. The autoclave, containing the polyamide composition, may be maintained at this temperature for about 30 minutes. This step may be followed by further heating of the polyamide polymer composition in the autoclave to about 285° C., for example, and introducing dry nitrogen to the autoclave vessel and pressurizing the autoclave by introducing dry nitrogen to about 4 to about 5 bar absolute pressure. The polymer composition may be released from the autoclave by opening a port in the autoclave vessel and allowing the molten polyamide composition to flow from the vessel in the form of laces. These laces may be cooled and quenched the in a current of water. Next, the laces of polyamide polymer may be granulated by known means and further cooled with water.

The autoclave process described above may provide a polyamide composition with a formic acid method RV of about 20 to about 60. In another embodiment, the autoclave process described above may provide a polyamide composition with a formic acid method RV of about 38 to about 45.

Optionally, the process may be modified to make a polyamide composition having about 25 to about 130 gram equivalents of amine ends per 1000 kilograms of polymer, in one embodiment, provided by the addition of an excess of an aqueous hexamethylene diamine solution to the aqueous solution of nylon salt; in another embodiment provided by addition of an aqueous solution of nylon salt rich in a diacid, such as adipic acid.

The nylon polymers and copolyamides described herein may be inherently acid-dyeable. In one embodiment, the number of free amine end groups (AEG) in these polymers is at least 25 gram equivalents per 1000 kilograms of nylon polymer. In order to make the polymers more deeply acid dyeable, an enhanced level of free amine end groups may be utilized. More deeply acid dyeing nylon polymers have an enhanced AEG level, e.g., at least 35 gram equivalents per 1000 kilograms of nylon polymer or AEG levels of 60 to 130 gram equivalents per 1000 kilograms of nylon polymer may be used.

Furthermore, it is noted that a masterbatch of polyetheramine comprising the amine end equivalent of a suitable diacid, e.g. adipic acid, may be made. This masterbatch may then be provided to the autoclave process. In an alternative embodiment, the polyamide composition herein may be made by a masterbatch process in which a flake or melt form is used comprising a polyetheramine dispersed in nylon, either nylon 6,6 or nylon 6. The flake or melt form is then subsequently added as a masterbatch comprising the nylon. In an embodiment, the masterbatch nylon flake containing the polyetheramine and the nylon, in flake form, are both melted. In an embodiment, the nylon flake containing polyetheramine is melted and added to the nylon melt. In either case, in a further embodiment the melt is forced from an extruder to a pump, which pumps the polyamide compositions to a pack and a spinneret for making yarns, for example.

The nylon polymers and copolyamides described herein may also be rendered into a basic dyeing form, i.e., receptive to coloration with base dyes also called cationic dyes. Such base-dyeing compositions are made from polyamide polymer with a cationic dye modifier copolymerized in the polymer. U.S. Pat. No. 5,164,261 to Windley describes the preparation of such cationic dye modified polyamides. In one embodiment, the polymer may be modified during polymerization with from 0.5 wt. % to 4 wt. % of a cationic dye modifier, e.g., 5-sulfoisophthalic acid. Typically, a weighed quantity of the sodium salt of 5-sulfoisophthalic acid may be combined with a known amount of the polyamide precursor salt in an autoclave using standard polymerization procedures known in the art. In one embodiment, the amount of cationic dye modifier present in the polymer may be from 0.75 wt. % to 3 wt. %, as determined by total sulfur analysis of the polymer. This amount of cationic dye modifier is reported as equivalent sulfonate groups. The sulfonate group concentration may be at least 25 gram equivalents per 1000 kilograms polymer up to 150 gram equivalents per 1000 kilograms polymer.

Polyamide Yarns

The polyamide composition of the present disclosure is particularly useful when spun into yarns. In one embodiment, the polyetheramine may be provided to the polyamide composition, and hence inherent to the yarn itself when formed into a fabric, as opposed to being applied on a fabric. In one embodiment, said yarn exhibits improved hydrophilic properties as measured by various water wicking and moisture regain tests.

A yarn made from the polyamides described herein may be a multifilament textile yarn in the form of either a low orientation yarn (LOY), a partially oriented yarn (POY) or a fully drawn yarn (FDY). The yarn may be a textured yarn made from partially oriented yarn. Moreover, the yarn may be substantially continuous, i.e. formed by one or more continuous filaments. In other embodiments, a continuous filament may be cut into staple fibers and the latter may be converted into a continuous thread by a spinning process, resulting in a continuous article of manufacture or comprised of shorter fibers. Such yarns may be used to make fabrics, which in turn may be used to make garments.

In one embodiment, apparatuses and methods for spinning yarns are disclosed in U.S. Pat. No. 6,855,425, and similar techniques may be likewise in the context of the polyamides prepared and described herein. Yarns made from the polyamides described herein may be textile yarns that are especially useful for apparel fabric applications. That is to say, yarns having a yarn weight of from 5 to 300 dtex, and a filament weight of from 0.5 to 7 dtex may be desirable. In certain embodiments, the yarn comprises from 1 to 300 filaments. According to some embodiments the yarn comprises 3 to 150 filaments. According to further embodiments the yarn has a DPF (dtex per filament) from 0.5 to 2.5, for example from 1 to 1.5.

Yarns made from the polyamides described herein may have a filament uniformity in Uster percent (U %) of 1.5% or less, more typically 1% or less. Such uniformity may be desirable in order for the yarn to have the high appearance uniformity needed for apparel applications, and also to reduce yarn breaks in texturing, weaving and knitting operations.

Yarns made from the polyamides described herein may have an elongation to break of from 20% to 120%. According to some embodiments the yarns have an elongation to break of from 20% to 90%. Typically, the yarns have a tenacity of from 25 to 65 cN/tex, for example from 30 to 45 cN/tex. These tensile properties are all desirable for apparel textile applications.

In certain embodiments, the yarn of the polyamide may have a titanium dioxide content less than 0.1 wt. %, and more typically, less than 0.01 wt. %, giving the yarn a clear or bright luster. In other embodiments, the yarn of the polyamide may have a titanium dioxide content greater than 0.3 wt. % and or even greater than 2 wt. %, giving the yarn a matt or dull luster. Titanium dioxide content between these ranges may also be used, e.g., from 0.1 wt. % to 0.3 wt. %, as well.

In one specific embodiment, yarns of the polyamide may be prepared by using known melt spinning process technology. With such technology, the granulated polyamide composition made by using the autoclave process, or the melt made by the masterbatch process, may both have an optical brightener therein as described above, and may be provided to the spinning machine. The molten polymer is forwarded by a metering pump to a filter pack, and extruded through a spinneret plate containing capillary orifices of a shape chosen to yield the desired filament cross-section at the spinning temperature. These cross-sectional shapes known in the art may include circular, non-circular, trilobal, hollow and diabolo shapes. Typical hollow filaments may be produced as disclosed in U.S. Pat. No. 6,855,425. Spinning temperatures may range from 270° C. to 300° C., for example. The bundle of filaments emerging from the spinneret plate is cooled by conditioned quench air, treated with spin finish (an oil/water emulsion), optionally interlaced, e.g. using an interlacing air jet.

In some embodiments the continuous yarn thus obtained is cut and transformed into staple fibers, which are subsequently used to produce threads or yarns by spinning, or for manufacturing nonwovens, by hydro-entanglement, needlepunching, ultrasonic bonding, chemical bonding, heat bonding or the like.

In the case of FDY, the in-line processing on the spinning machine typically includes making several turns around a set of Godet rolls (feed rolls), the number of turns being sufficient to prevent slippage over these rolls, then passing the yarn over another set of rolls (draw rolls) rotating at sufficient speed to stretch the yarn by a predetermined amount (the draw ratio). Finally, the process is continued by heat setting and relaxing the yarn with a steam-box before winding up at a speed of at least 3000 m/min, preferably at least 4000 m/min, for example 4800 m/min or more. Optionally, an alternative heat setting (or relaxing) method may be used, such as heated rolls, and an additional set of Godet rolls may be incorporated between draw rolls and winder to control the tension while the yarn is set or relaxed. Also, optionally, a second application of spin finish and/or additional interlacing may be applied before the final winding step.

In the case of POY, the additional in-line processing typically includes only making an S-wrap over two Godet rolls rotating at the same speed, and then passing the yarn to a high speed winder, winding at a speed of at least 3000 m/min, preferably at least 4000 m/min, for example 4800 m/min or more. Use of the S-wrap is beneficial to control tension, but not essential. Such a POY may be used directly as a flat yarn for weaving or knitting, or as a feedstock for texturing.

The LOY spinning process is similar to POY except that a windup speed of 1000 m/min or below is used. These low orientation yarns, in general, are further processed via a second stage, e.g., on a conventional draw-twister or draw-wind machine.

In one embodiment, the polyamide polymer disclosed herein may be highly suited for spinning into continuous filaments which may be converged to form multifilament yarns. The process of spinning synthetic polymers as continuous filaments and forming multifilament yarns is known to the skilled person. In general, successful spinning of filaments uses a spinneret plate having at least a single capillary orifice. The capillary orifices correspond to each individual filament comprising the yarn. Circular and non-circular cross-section spinneret capillary orifices (or extrusion orifice) are employed depending upon the cross sectional shape sought for the filament. In general, for a certain polymer throughput G (e.g., in grams per minute) per capillary, the following equation applies:

$$G = \rho(\text{melt}) D2(\text{capillary})(\pi/4) v(\text{extrusion}) \qquad \text{Equation 1.}$$

In this equation, $\rho$ is the polymer melt density (e.g., for melted nylon 6,6 at 290° C. equal to 1.0 gram per cm3), D is the diameter (equal to twice the radius) of the capillary assuming a circular orifice, and v is the velocity of the filament.

The extrusion velocity is given by the following equation:

$$v(\text{extrusion}) = G(4/\pi) D2(\text{capiliary}) \rho(\text{melt}) \qquad \text{Equation 2.}$$

In one embodiment, the polymer is extruded at an extrusion velocity in the range of 20 centimeters per second to 80 centimeters per second. In another embodiment, the freshly extruded filaments may be quenched with conditioned air in the known manner. In this step, the individual filaments are cooled in a quench cabinet with a side draft of conditioned air and converged and oiled with a primary finish, as known in the art, into a yarn. The yarn is forwarded by feed roll onto a draw roll pair where the yarn is stretched and oriented to form a drawn yarn which is directed by roll into a yarn stabilization apparatus. Such a stabilization apparatus is common to the art and here optionally employed as a yarn post-treatment step. Finally, the yarn is wound up as a yarn package at a yarn speed in the range of 1000 to 6500 meters per minute. The yarn RV (or relative viscosity by the formic acid method) can range from about 20 to about 65.

In an embodiment, the yarn is a drawn yarn with elongation of 22% to 60%, the boiling water shrinkage is in the range of 3% to 10%, the yarn tenacity is the range of 3 to 7 grams per denier, and the RV of the yarn may be varied and controlled well within a range of 40 to 60. The yarn is a dull luster multifilament polyamide yarn.

A derived parameter characterizing the superior properties of this yarn is called the Yarn Quality and found by the product of the yarn tenacity (grams per denier) and the square root of the % elongation, as in Equation 3.

$$\text{YARN QUALITY} = \text{tenacity} \times (\text{elongation})^{1/2} \qquad \text{Equation 3.}$$

The Yarn Quality is an approximation to the measure of yarn "toughness." As is known to those skilled in the art, the area under the yarn load elongation curve is proportional to the work done to elongate the yarn. Where tenacity is expressed in terms of force per unit denier, for example, and the elongation expressed as a per cent change per unit of length, the load elongation curve is the stress-strain curve. In this case the area under the stress-strain curve is the work to extend the yarn or the yarn toughness. The yarn quality improvement provides an apparel polyamide yarn which is more acceptable in varied applications. These applications may include, without limitation, warp knit fabrics, circular knit fabrics, seamless knit garments, hosiery products, non-woven fabrics and light denier technical fabrics.

In certain embodiments, the polyamide yarns have different dyeing characteristics with anionic dyes or cationic dyes. These dyeing characteristics may arise from different numbers of amine end groups. The concentration of amine end groups (AEG) influences how deeply the polyamide is dyed by anionic dyes. Alternatively or additionally, the polyamides may contain anionic end groups, such as sulfonate or carboxylate end groups, that render the polyamide cationic-dyeable.

In certain embodiments, the polyamide yarns are dyed with fiber reactive dyes which incorporate vinylsulfonyl and/or β-sulfatoethylsulfonyl groups. Such fiber reactive dyes are known from U.S. Pat. No. 5,810,890.

In certain embodiments, the polyamide yarns are dyed with fiber reactive dyes which incorporate halogen derivatives of nitrogen heterocyclic groups, such as, triazine, pyrimidine and quinoxaline. Such fiber reactive dyes are described, for example, in U.S. Pat. No. 6,869,453. In other embodiments, the filaments comprise an amine component of hexamethylene diamine. In still other embodiments, the filaments comprise an amine component which is a mixture of hexamethylene diamine with at least 20 wt. % of methyl pentamethylene diamine based on the total weight of diamine In further embodiments, the polyamides may comprise nylon 6.

The following testing discussion may be used to characterize the various parameters as discussed herein. Yarn tenacity and the yarn elongation may be determined according to ASTM method D 2256-80 (known at the time of filing the present disclosure with the United States Patent and Trademark Office) using an INSTRON tensile test apparatus (Instron Corp., Canton, Mass., USA 02021) and a constant cross head speed. Tenacity is expressed as centiNewtons per tex grams of force per denier, and the elongation percent is the increase in length of the specimen as a percentage of the original length at breaking load.

Yarn linear density evenness, also known as the yarn Uster percent (U %), may be determined using a Uster evenness tester 3, type C, which is known in the art to the skilled person.

Polymer amine ends may be measured by directed titration with standardized perchloric acid solution of weighed polymer samples dissolved in phenolic type solvents well known in the art.

The moisture regain of a polymer is measured by the following method. A sample (100 g) of the polymer is dried for 18 hours at 80° C. under vacuum. The initial moisture level of this dried polymer sample is preferably measured using an Aquatrac (PET version (4 Digit); Brabender Messtechnik) at 160° C. setting on about 1.9 g polymer. A moisture level measured using this method of less than 0.5 wt. % is taken to indicate that the polymer had been dried sufficiently.

The dried sample is then immersed in demineralised water (500 g) at ambient temperature (20° C.) without any agitation. After 48 hours a sample is removed (approx. 10 g) and patted dry with an absorbent tissue. A portion of the sample (approx. 5 g; weight of wet sample) is weighed accurately into a foil dish and placed in an oven at 80° C. under vacuum for 18 hours. The dish is removed and placed in a desiccator to cool, and then reweighed (weight left after drying). This procedure is repeated at intervals thereafter (e.g. 72, 144, 190 and 220 hours) up to 220 hours. Moisture uptake was determined by the following calculation:

$$\frac{\text{weight of wet sample} - \text{weight left after drying} \times 100}{\text{weight of sample after drying}} = \% \text{ uptake}$$

The moisture regain of the polymer is defined as the moisture uptake after 220 hours or until the sample has reached moisture uptake equilibrium (which is defined as a weight change of no more than 1% in a 24 hour period), whichever is the earlier. Thus, if moisture uptake equilibrium has not been reached by 220 hours the moisture regain is the moisture uptake at 220 hours. When the moisture uptake equilibrium is reached before 220 hours, the moisture regain is the average (mean) of the moisture uptake for the first two consecutive measurements taken at equilibrium. By this test, nylon 6,6 flake without modification would have a moisture regain of 8.5 wt. %. An alternative test is to spin the nylon flake into yarn and by a similar method of immersion in water determine the equilibrium moisture uptake. A further alternative method is to spin the nylon flake into yarn and expose the yarn to a relative humidity controlled atmosphere, say 50% RH at 23° C. and determine equilibrium moisture uptake. The purpose of these tests is to demonstrate improvement in moisture regain of the hydrophilic polyetheramine containing composition as against composition without the polyetheramine.

The water wicking rates of fabrics constructed from the yarn may be measured by vertically immersing the bottom 1.8 inches (4.6 cm) of a one inch (2.5 cm) wide strip of the scoured fabric in de-ionized water, visually determining the height of the water wicked up the fabric, and recording the height as a function of time. "Initial wicking rate" means the average wicking rate during the first two minutes of the wicking test.

A fabric or garment "Percent Dry Time" test may be used to characterize the hydrophilic polyamide yarns, fabric and garments. Also known as percent dry time tests or "horizontal wicking" determinations. Percent dry time tests are done using a balance and computer; e.g., Mettler balance AE163 and computer running a Mettler BalanceLink 3.0 program. The weight of a circular sample of fabric 2 inches (5.1 cm) in diameter is obtained and recorded. Using an automated pipette, 0.10 gram of tap water is placed on the balance and its weight recorded. The circular fabric sample is immediately centered over and then placed on the water. The total weight of fabric and water is recorded at that time (time=zero minutes) and every two minutes thereafter for the next 30 minutes. Percent dry results for a given time are calculated according to the following formula: % Dry=100× [Wtotal−Wfabric)/WH$_2$O]×100.

EXAMPLES

The following examples are carried out using an evaporator and an agitated autoclave, equipped with a thermocouple (single device with four thermocouples on different elevations) in the vapor space and a pressure control valve. The assets are heated with a suitable heat transfer fluid, for example, a synthetic organic fluid such as liquid Dowtherm brand heat transfer fluid. The Dowtherm brand heat transfer fluids are available for purchase from Dow Chemical of Midland, Mich. In the following examples, Downtherm A (a mixture of C14-C30 alkyl benzenes intended for use in liquid-phase applications) is used at about 325° C.

Comparative Example 1

Comparative Example 1 illustrates unacceptable control of foaming that occurs in the consecutive batch being made on the heel of the previous batch containing a polyetheramine such as Elastamine RE 2000. The term "heel" as used herein refers to material retained in a batch polymerization reactor after routine emptying in the absence of a washing step.

Initial Batch 4835 parts of Nylon 6,6 salt, as an about 54 wt. % aqueous solution, 205 parts of half salt (an aqueous solution of 15 w % Nylon 6,6 salt and 7.5 w % free adipic acid) and 0.33 parts of Silwet L-7605 antifoam, as an about 9.6 wt. % aqueous solution, were introduced into the evaporator and concentrated to an about 85 wt. % solution using standard conditions and methods well known in the art. The concentrated solution was transferred into the autoclave where there was no heel of polymer which had incorporated into it Elastamine RE 2000.

With the pressure control valve closed, Dowtherm flow at 100% normal flow (for a N66 polymer process) and agitator speed at 80 rpm, the contents were heated. After reaching a pressure of 218 psia, the agitator speed was gradually reduced to 0 rpm, while the Dowtherm flow was maintained at 100% normal flow. The pressure was allowed to increased further to 265 psia, from where it was automatically controlled at 265 psia by the pressure control valve which was approximately 50% fully open. When the temperature reached about 243° C., the pressure was allowed to gradually reduce. When the pressure reduction reached 218 psia, 115 ppm (on final weight of polymer, ofwp) Silwet L-7605 antifoam, as an about 24 wt. % aqueous solution, was added to the autoclave. When the pressure had fallen to about 43 psia, 0.7% ofwp of hot molten Elastamine RE 2000 (140° C.) was added. The pressure was then allowed to gradually fall to atmospheric pressure. The batch was finished and cast to polymer flake by methods well known in the art. The following are indications for acceptable foaming behaviour in this example: No temperature peaks on the vapour phase thermocouples were observed; The vent valve opened to its normal degree of opening; No autoclave over pressurisation peaks were observed either when controlling at 265 psia or during pressure let down; Vacuum conditions could be established when finishing the polymer indicating the absence of foam expelled material in the vacuum lines.

Whilst the batch above was processing in the autoclave a further batch of nylon salt was concentrated as above in the evaporator. The concentrated solution of N66 salt was transferred into the autoclave containing the residual heel of polymer which had incorporated the 0.7 w % Elastamine RE 2000.

1st Consecutive Batch

With the pressure control valve closed, Dowtherm flow at 100% normal flow (for a N66 polymer process) and agitator speed at 80 rpm, the contents were heated. After reaching a pressure of 218 psia, the agitator speed was gradually reduced to 0 rpm, while the Dowtherm flow was maintained at 100% normal flow. The pressure was allowed to increase further to 265 psia, the pressure control valve opened to approximately 70% fully open but slight transient over pressurisation (i.e >265 psia target) occurred and the vapour phase thermocouple experienced a transient rise in temperature. When the temperature reached about 243° C., the pressure was allowed to gradually reduce. When the pressure reduction reached 218 psia, 115 ppm (on final weight of polymer, ofwp) Silwet L-7605 antifoam, as an about 24 wt. % aqueous solution, was added to the autoclave. When the pressure had fallen to about 43 psia, 1.5% ofwp of hot molten Elastamine RE 2000 (140° C.) was added. The pressure was then allowed to gradually fall to atmospheric pressure without incident. The batch was finished and cast to polymer flake by methods well known in the art. The following are indications for unacceptable foaming behaviour in this example: the temperature peaks on the vapour phase thermocouples that were observed; the vent valve opened beyond its normal degree of opening; autoclave over pressurisation peaks were observed when controlling at 265 psia.

Whilst the batch above was processing in the autoclave a further batch of nylon salt was concentrated as above in the evaporator. The concentrated solution of N66 salt was transferred into the autoclave containing the residual heel of polymer which had incorporated the 1.5 w % Elastamine RE 2000.

2nd Consecutive Batch

With the pressure control valve closed, Dowtherm flow at 100% normal flow (for a N66 polymer process) and agitator speed at 80 rpm, the contents were heated. After reaching a pressure of 218 psia, the agitator speed was gradually reduced to 0 rpm, while the Dowtherm flow was maintained at 100% normal flow. The pressure was allowed to increase further to 265 psia, the pressure control valve opened to approximately 100% fully open and a significant over pressurisation (i.e >265 psia target) occurred and the vapour phase thermocouple experienced a transient rise in temperature. When the temperature reached about 243° C., the pressure was allowed to gradually reduce. When the pressure reduction reached 218 psia, 115 ppm (on final weight of polymer, ofwp) Silwet L-7605 antifoam, as an about 24 wt. % aqueous solution, was added to the autoclave. When the pressure had fallen to about 43 psia, 0.5% ofwp of hot molten Elastamine RE 2000 (140° C.) was added. The pressure was then allowed to gradually fall to atmospheric pressure without incident. The batch was finished and cast to polymer flake by methods well known in the art. The following are indications for unacceptable foaming behaviour in this example: the temperature peaks on the vapour phase thermocouples that were observed; the vent valve opened beyond its normal degree of opening; autoclave over pressurisation peaks were observed either when controlling at 265 psia; inspection of the vent lines showed that they had become partially blocked indicating loss of material out of the vessel due to the foaming. As evidenced by these observations the higher level of Elastamine RE 2000 in the residual heel caused a more severe unacceptable foaming event.

Comparative Example 2:

The purpose of Comparative Example 2 is to demonstrate acceptable control of foaming that occurs when starting from a clean autoclave during a polymerization process on a commercial Nylon 6,6 autoclave with an agitator and with high levels of Elastamine RE 2000 being added late in the polymerisation process.

The intent was to produce a Nylon 6,6 polymer with 8.0 wt. % Elastamine RE 2000, where the autoclave had been cleaned of polymer material from previous production runs.

4835 parts of Nylon 6,6 salt, as an about 54 wt. % aqueous solution, 205 parts of half salt (an aqueous solution of 15 w % Nylon 6,6 salt and 7.5 w % free adipic acid) and 0.33 parts of Silwet L-7605 antifoam, as an about 9.6 wt. % aqueous solution, were introduced into the evaporator and concentrated to an about 85 wt. % solution using standard conditions and methods well known in the art. The concentrated solution was transferred into the autoclave.

With the pressure control valve closed, Dowtherm flow at 100% normal flow (for a N66 polymer process) and agitator speed at 80 rpm, the contents were heated. After reaching a pressure of 218 psia, the agitator speed was gradually reduced to 0 rpm, while the Dowtherm flow was maintained at 100% normal flow. The pressure was allowed to increased further to 265 psia, from where it was automatically controlled at 265 psia by the pressure control valve which was approximately 50% fully open. The agitator speed was increased to 65 rpm and then gradually raised to 80 rpm. When the temperature reached about 243° C., the pressure was allowed to gradually reduce. Directly at the start of the pressure reduction, 1.2 parts of Silwet L-7605 antifoam, as an about 24 wt. % aqueous solution, was added to the autoclave. When the pressure had fallen to about 218 psia, 200 parts of hot molten Elastamine RE 2000 at 140° C. was added. The pressure was then allowed to gradually fall to atmospheric pressure. The batch was finished by methods well known in the art. The following are indications for acceptable foaming behaviour in this example: No temperature peaks on the vapour phase thermocouples were observed; No autoclave over pressurisation peaks were observed either when controlling at 265 psia or during pressure let down; Vacuum conditions could be established when finishing the polymer indicating the absence of foam expelled material in the vacuum lines.

The teachings of Comparative Example 1 and 2 are that when there is no residual heel of polymer containing Elastamine RE 2000 in the autoclave it is possible to produce polymer containing even high levels of Elastamine RE 2000 by adding the batch's intended quantity of Elastamine RE 2000 late in the process and so avoid unacceptable foaming earlier in the process (as per PCT Application US2015/047742, filed Aug. 29, 2015), but when there is a residual heel of polymer containing Elastamine RE 2000 (even at low levels of Elastamine RE 2000) in the autoclave this induces unacceptable foaming early in the process prior to the addition of the batch's intended quantity of Elastamine RE 2000.

The problem to solve, therefore, is how to avoid unacceptable foaming early in the process (prior to adding the batch's intended quantity of Elastamine RE 2000 that will be added to the batch later in the process as taught in WO2014/179049) when there is a residual heel of polymer containing Elastamine RE 2000 in the autoclave.

Example 1

Initial Batch 5014 parts of Nylon 6,6 salt, as an about 54 wt. % aqueous solution, 255 parts of half salt (an aqueous solution of 15 w % Nylon 6,6 salt and 7.5 w % free adipic acid) and 0.43 parts of Silwet L-7605 antifoam, as an about 9.6 wt. % aqueous solution, were introduced into the evaporator and concentrated to an about 85 wt. % solution using standard conditions and methods well known in the art. The concentrated solution was transferred into the autoclave where there was no heel of polymer which had incorporated into it Elastamine RE 2000.

With the pressure control valve closed, Dowtherm flow at 100% normal flow (for a N66 polymer process) and agitator speed at 80 rpm, the contents were heated. After reaching a pressure of 218 psia, the agitator speed was reduced to 0 rpm, while the Dowtherm flow was maintained at 100% normal flow. The pressure was allowed to increase further to 265 psia, from where it was automatically controlled at 265 psia by the pressure control valve which was approximately 50% fully open. A slurry of titanium dioxide (as a delusterent) was added by methods well known in the art at the 0.24 w % ofwp level. When the temperature reached about 243° C., the pressure was allowed to gradually reduce. 115 ppm (on final weight of polymer, ofwp) Silwet L-7605 antifoam, as an about 24 wt. % aqueous solution, was added to the autoclave. When the pressure had fallen to about 218 psia, 8.0% ofwp of hot molten Elastamine RE 2000 (140° C.) was added. The pressure was then allowed to gradually fall to atmospheric pressure. The batch was finished and cast to polymer flake by methods well known in the art. The following are indications for acceptable foaming behaviour in this example: No temperature peaks on the vapour phase thermocouples were observed; The vent valve opened to its normal degree of opening; No autoclave over pressurisation peaks were observed either when controlling at 265 psia or during pressure let down; Vacuum conditions could be established when finishing the polymer indicating the absence of foam expelled material in the vacuum lines.

Whilst the batch above was processing in the autoclave a further batch of Nylon salt was concentrated as above in the evaporator. The concentrated solution of N66 salt was transferred into the autoclave containing the residual heel of polymer which had incorporated the 8.0 w % Elastamine RE 2000.

1st Consecutive Batch 5014 parts of Nylon 6,6 salt, as an about 54 wt. % aqueous solution, 255 parts of half salt (an aqueous solution of 15 w % Nylon 6,6 salt and 7.5 w % free adipic acid) and 0.43 parts of Silwet L-7605 antifoam, as an about 9.6 wt. % aqueous solution, were introduced into the evaporator and concentrated to an about 85 wt. % solution using standard conditions and methods well known in the art. The concentrated solution was transferred into the autoclave where there was a heel of polymer which had incorporated into it Elastamine RE 2000 from the previous batch described above.

With the pressure control valve closed, Dowtherm flow at about 100% normal flow (for a N66 polymer process) and agitator speed at 80 rpm, the contents were heated. After reaching a pressure of about 175 psia the Dowtherm flow was reduced to about 9% normal flow. When the pressure reached about 218 psia, the agitator speed was reduced to about 65 rpm, while the Dowtherm flow was maintained at 9% normal flow. The pressure was allowed to increase further to 265 psia, from where it was automatically controlled at 265 psia by the pressure control valve which was approximately 50% fully open. After about 5 minutes the agitator speed was increase back to 80 rpm and the Dowtherm flow gradually increase back to 100% of normal flow over about 10 minutes. A slurry of titanium dioxide (as a delusterent) was added by methods well known in the art at the 0.17 w % ofwp level.

When the temperature reached about 243° C., the pressure was allowed to gradually reduce. 115 ppm (on final weight of polymer, ofwp) Silwet L-7605 antifoam, as an about 24 wt. % aqueous solution, was added to the autoclave. When the pressure had fallen to about 218 psia, 8.0% ofwp of hot molten Elastamine RE 2000 (140° C.) was added. The pressure was then allowed to gradually fall to atmospheric pressure. The batch was finished and cast to polymer flake by methods well known in the art. The following are indications for acceptable foaming behaviour in this example: No temperature peaks on the vapour phase thermocouples were observed; The vent valve opened to its normal degree of opening; No autoclave over pressurisation peaks were observed either when controlling at 265 psia or during pressure let down; Vacuum conditions could be established when finishing the polymer indicating the absence of foam expelled material in the vacuum lines.

What is claimed is:

1. A process for making polyamide comprising:
    (a) at least partially polymerizing a first aqueous charge of a diamine and a diacid to form polyamide in a reactor;
    (b) adding a polyetheramine to the reactor and further polymerizing the diamine, diacid and polyetheramine to form polyetheramine-containing polyamide in the reactor;
    (c) recovering a first portion of the polyetheramine-containing polyamide from the reactor and retaining a second portion of the polyetheramine-containing polyamide within the reactor;
    (d) loading the reactor with a second aqueous charge of diamine and diacid and at least partially polymerizing the second aqueous charge with the second portion of the polyetheramine-containing polyamide within the reactor;
    (e) heating the reactor at heat input rate Q1 to temperature range T1 and pressure range P1;
    (f) reducing the heat input rate to Q2 and holding the reactor at temperature range T2 and pressure range P2 for about 1 minute to about 40 minutes to reduce the water content of the polymerizing mass;
    (g) adding polyetheramine to the reactor; and
    (h) increasing the heat input rate to the reactor to Q3, where Q3 >Q2, and at least partially venting the reactor to control pressure at or below range P1, and further polymerizing to form polyetheramine-containing polyamide within the reactor.

2. The process of claim 1 wherein the second aqueous charge loaded to the reactor contains from 10 wt.% to 30 wt.% water.

3. The process of claim 1, wherein the polyetheramine is present in the polyetheramine-containing polyamide of step (f) in an amount ranging from 1 wt.% to 20 wt.%.

4. The process of claim 1, wherein the diacid in the first aqueous charge, the diacid in the second aqueous charge, or both, is selected from the group consisting of oxalic acid, malonic acid, succinic acid, glutaric acid, pimelic acid, adipic acid, suberic acid, azelaic acid, sebacic acid, undecanedioic acid, dodecandioic acid, maleic acid, glutaconic acid, traumatic acid, and muconic acid, 1,2- or 1,3-cyclohexane dicarboxylic acids, 1,2- or 1,3-phenylenediacetic acids, 1,2- or 1,3-cyclohexane diacetic acids, isophthalic acid, terephthalic acid, 4,4'-oxybisbenzoic acid, 4,4-benzophenone dicarboxylic acid, 2,6-napthalene dicarboxylic acid, p-t-butyl isophthalic acid and 2,5-furandicarboxylic acid, and mixtures thereof, and wherein the diamine in the first aqueous charge, the diamine in the second aqueous charge, or both, is selected from the group consisting of ethanol diamine, trimethylene diamine, putrescine, cadaverine, hexamethyelene diamine, 2-methyl pentamethylene diamine, heptamethylene diamine, 2-methyl hexamethylene diamine, 3-methyl hexamethylene diamine, 2,2-dimethyl pentamethylene diamine, octamethylene diamine, 2,5-dimethyl hexamethylene diamine, nonamethylene diamine, 2,2,4- and 2,4,4-trimethyl hexamethylene diamines, decamethylene diamine, 5-methylnonane diamine, isophorone diamine, undecamethylene diamine, dodecamethylene diamine, 2,2,7,7-tetramethyl octamethylene diamine, bis(p-aminocyclohexyl)methane, bis(aminomethyl)norbornane, C2-C16 aliphatic diamine optionally substituted with one or more C1 to C4 alkyl groups, furanic diamines, 2,5-bis (aminomethyl)furan, and mixtures thereof.

5. The process of claim 1, wherein the first aqueous charge, the second aqueous charge, or both, further comprises a catalyst.

6. The process of claim 1, wherein the polyetheramine is a polyetherdiamine.

7. The process of claim 1, wherein the polyetheramine has a weight average molecular weight of at least 1500.

8. The process of claim 1, wherein the polyetheramine has a number average molecular weight of at least 1500.

9. The process of claim 1, wherein T2 is from 160° C. to 250° C.

10. The process of claim 1, wherein the polyamide has moisture regain from 8 to 30%.

11. The process of claim 1, wherein the recovering step (c) is carried out in the absence of any one of steam cleaning, water washing or acid-solution washing.

12. The process of claim 1, wherein the second portion of polyamide retained in the reactor is a liquid or solid film on a portion of the reactor internals.

13. The process of claim 1, wherein $$0.05 < \frac{Q2}{Q1} < 0.95.$$

14. The process of claim 1, wherein $$0.15 < \frac{Q2}{Q1} < 0.70.$$

15. The process of claim 1, wherein T1 is from 160° C. to 230° C. and P1 is from 50 psia to 325 psia.

16. The process of claim 1, wherein T2 is from 190° C. to 250° C. and P2 is from 200 psia to 325 psia.

17. The process of claim 1, comprising holding the reactor at temperature range T2 and pressure range P2 for about 7 to about 20 minutes.

18. The process of claim 1, wherein steps (c) to (h) are consecutively repeated.

19. A process for making polyamide comprising:
    a. charging diamine and diacid to the feed inlet of a continuous plug flow reactor under reaction conditions to at least partially form polyamide;
    b. downstream of the feed inlet, adding a first stream of polyetheramine to the continuous plug flow reactor and further polymerizing the diamine, diacid and polyetheramine to form polyetheramine-containing polyamide in the continuous plug flow reactor;
    c. recovering a first portion of the polyetheramine-containing polyamide from the outlet of the continuous plug flow reactor and recycling a second portion of the polyetheramine-containing polyamide to a recycle charge point downstream of the feed inlet;
    d. providing a primary polymerization section of the continuous plug flow reactor at heat input rate Q1 to temperature range T1 and pressure range P1;
    e. providing a secondary polymerization section downstream of the primary polymerization section of the continuous plug flow reactor, at heat input rate to Q2 and at temperature range T2 and pressure range P2 for about 1 minute to about 40 minutes to reduce the water content of the polymerizing mass;

f. adding a second stream of polyetheramine to the continuous plug-flow reactor downstream of the secondary polymerization section; and g. providing a tertiary polymerization zone with heat input rate Q3, where Q3 >Q2, and at least partially venting the continuous plug flow reactor to control pressure at or below range P1 to form polyetheramine-containing polyamide within the continuous plug flow reactor.

20. A process for making polyamide comprising:

a. at least partially polymerizing a first aqueous charge of polyamide precursor to form polyamide in a reactor;

b. adding a polyetheramine to the reactor and further polymerizing the polyamide precursor and polyetheramine to form polyetheramine-containing polyamide in the reactor;

c. recovering a first portion of the polyetheramine-containing polyamide from the reactor and retaining a second portion of the polyetheramine-containing polyamide within the reactor;

d. loading the reactor with a second aqueous charge of polyamide precursor and at least partially polymerizing the second aqueous charge with the second portion of polyetheramine-containing polyamide within the reactor;

e. heating the reactor at heat input rate Q1 to temperature range T1 and pressure range P1;

f. reducing the heat input rate to Q2 and holding the reactor at temperature range T2 and pressure range P2 for about 1 minute to about 40 minutes to reduce the water content of the polymerizing mass;

g. adding polyetheramine to the reactor; and h. increasing the heat input rate to the reactor to Q3, where Q3 >Q2, and at least partially venting the reactor to control pressure at or below range P1 to form polyetheramine-containing polyamide within the reactor.

* * * * *